(12) United States Patent
Overy et al.

(10) Patent No.: US 7,272,404 B2
(45) Date of Patent: Sep. 18, 2007

(54) POSITION ACQUISITION

(75) Inventors: Michael Overy, Medstead (GB); Natividade Lobo, Windsor (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/429,937

(22) Filed: May 9, 2006

(65) Prior Publication Data

US 2006/0270349 A1  Nov. 30, 2006

Related U.S. Application Data

(62) Division of application No. 10/182,826, filed as application No. PCT/GB01/00434 on Feb. 2, 2001, now Pat. No. 7,107,065.

(30) Foreign Application Priority Data

Feb. 2, 2000 (GB) ................................ 0002404.2
Aug. 7, 2000 (GB) ................................ 0019366.4

(51) Int. Cl.
*H04Q 7/20* (2006.01)

(52) U.S. Cl. ................. 455/456.1; 455/3.01; 455/3.05; 455/41.2; 455/404.2; 455/456.2; 455/456.6; 370/338; 370/400; 370/408; 702/150; 702/151; 702/152; 702/153; 340/825.49; 342/386; 342/450; 342/458; 342/463

(58) Field of Classification Search ............. 455/3.01, 455/3.05, 11.1, 41.2, 41.3, 66.1, 115.3, 404.2, 455/420, 422.1, 446, 448, 456.1, 456.2, 456.6, 455/500; 370/252, 254, 310, 338, 351, 400, 370/407, 408, 432; 342/385, 386, 450, 453, 342/457, 458, 463; 379/102.01, 102.02, 379/102.03; 702/150–153; 340/825.36, 340/825.49

See application file for complete search history.

(56) References Cited

U.S. PATENT DOCUMENTS

| 4,549,293 A | 10/1985 | Christian et al. |
| 4,782,450 A | 11/1988 | Flax |
| 4,796,191 A | 1/1989 | Honey |

(Continued)

FOREIGN PATENT DOCUMENTS

GB   2 329 777 A   3/1999

(Continued)

OTHER PUBLICATIONS

International Preliminary Examination Report and Cover Sheet to PCT/GB01/00440 dated Jun. 21, 2002.

(Continued)

*Primary Examiner*—William Trost
*Assistant Examiner*—James D Ewart
(74) *Attorney, Agent, or Firm*—Banner & Witcoff, Ltd

(57) ABSTRACT

A first transceiver (4, 30) can position itself by forming an ad hoc network (20) of transceivers which assist the first transceiver in acquiring its position. A dedicated infrastructure such as GPS satellites is not required. The first transceiver (4, 30), once it has acquired its position, can be involved in a network (20) by another transceiver (32, 34, 36, 38, 40) to assist in the positioning of that transceiver. The acquisition of the position may involve factors such as the trustworthiness of the transceivers in the network and/or the positions of transceivers with which the first transceiver cannot directly communicate.

21 Claims, 15 Drawing Sheets

U.S. PATENT DOCUMENTS

| | | | |
|---|---|---|---|
| 5,045,860 A | 9/1991 | Hodson | |
| 5,056,106 A | 10/1991 | Wang et al. | |
| 5,119,341 A | 6/1992 | Youngberg | |
| 5,216,429 A | 6/1993 | Nakagawa et al. | |
| 5,293,645 A | 3/1994 | Sood | |
| 5,481,532 A * | 1/1996 | Hassan et al. | 370/312 |
| 5,579,285 A | 11/1996 | Hubert | |
| 5,589,838 A | 12/1996 | McEwan | |
| 5,732,354 A | 3/1998 | MacDonald | |
| 5,774,826 A | 6/1998 | McBride | |
| 5,802,467 A | 9/1998 | Salazar et al. | |
| 5,838,472 A | 11/1998 | Welch et al. | |
| 5,912,644 A | 6/1999 | Wang | |
| 5,959,580 A | 9/1999 | Maloney et al. | |
| 5,963,624 A | 10/1999 | Pope | |
| 5,974,236 A * | 10/1999 | Sherman | 709/221 |
| 6,012,013 A | 1/2000 | McBurney | |
| 6,016,118 A | 1/2000 | Jackson et al. | |
| 6,021,330 A | 2/2000 | Vannucci | |
| 6,054,950 A * | 4/2000 | Fontana | 342/463 |
| 6,115,580 A * | 9/2000 | Chuprun et al. | 455/1 |
| 6,127,975 A | 10/2000 | Maloney | |
| 6,256,296 B1 | 7/2001 | Ruziak et al. | |
| 6,275,707 B1* | 8/2001 | Reed et al. | 455/456.3 |
| 6,304,556 B1* | 10/2001 | Haas | 370/254 |
| 6,330,429 B1* | 12/2001 | He | 455/67.11 |
| 6,442,495 B1* | 8/2002 | Fleming-Dahl | 702/69 |
| 6,453,168 B1 | 9/2002 | McCrady et al. | |
| 6,486,794 B1 | 11/2002 | Calistro et al. | |
| 6,594,468 B1* | 7/2003 | Ramanathan | 455/7 |
| 6,661,379 B2 | 12/2003 | Stilp et al. | |
| 6,721,537 B1* | 4/2004 | Briesemeister | 455/11.1 |
| 6,751,455 B1 | 6/2004 | Acampora | |
| 6,980,524 B1* | 12/2005 | Lu et al. | 370/254 |
| 7,006,453 B1* | 2/2006 | Ahmed et al. | 370/255 |
| 2002/0065099 A1 | 5/2002 | Bjorndahl | |
| 2004/0203380 A1* | 10/2004 | Hamdi et al. | 455/41.2 |

FOREIGN PATENT DOCUMENTS

| | | |
|---|---|---|
| GB | 2329777 | 3/1999 |
| GB | 2 338 374 A | 12/1999 |
| GB | 2338374 | 12/1999 |
| WO | 98/29758 | 7/1998 |
| WO | 9829758 | 7/1998 |
| WO | 99/61932 | 12/1999 |
| WO | 99/61933 | 12/1999 |

OTHER PUBLICATIONS

Information Disclosure Statement for U.S. Appl. No. 10/182,615 dated May 7, 2003.

Information Disclosure Statement for U.S. Appl. No. 10/182,615 dated Aug. 1, 2002.

Preliminary Amendment for U.S. Appl. No. 10/182,615 dated Aug. 1, 2002.

Office Action for U.S. Appl. No. 10/182,615 dated Jan. 25, 2005.

Amendment for U.S. Appl. No. 10/182,615 dated Jun. 27, 2005.

Office Action for U.S. Appl. No. 10/182,615 dated Oct. 6, 2005.

* cited by examiner

Add one

Remove

POSITION ACQUISITION

RELATED APPLICATION INFORMATION

This application is a divisional application based on co-pending application Ser. No. 10/182,826 filed on Oct. 28, 2002 entitled "Position Acquisition", which is a 371 application from PCT/GB01/00434 filed on Feb. 2, 2001, which is based upon and claims benefit from prior United Kingdom Patent Application No. 0002404.2, filed Feb. 2, 2000, and from United Kingdom Patent Application No. 0019366.4, filed Aug. 7, 2000, the entire contents of both these applications are expressly incorporated herein by reference.

FIELD OF THE INVENTION

The present invention relates to the use of wireless technology to estimate the position of a person or device. It particularly relates to a radio transceiver arranged to determine its location by receiving messages transmitted from a first plurality of proximal radio transceivers and also arranged to facilitate the determination of the location of a second proximal radio transceiver by transmitting a message or messages to that second proximal transceiver and to ad hoc networks formed by arrangements of such transceivers.

DESCRIPTION OF THE PRIOR ART

It is often desirable to be able to determine one's position or to determine the position of another person or device. The Global position system (GPS) allows the location of specialist receivers to be positioned on the surface of the earth. GPS uses a fixed network of satellite transmitters orbiting the earth to transmit to and thereby locate the receiver. Cellular positioning systems have also been proposed in which the existing network of fixed base station transceivers is used to locate a mobile phone. The unchanging position and identity of the fixed base stations and the distance of the mobile phone from the base stations is used to estimate the phones location. Both of these systems operate over large distances exceeding many kilometres.

A radio location system suitable for tracking objects over shorter distances is proposed in U.S. Pat. No. 5,119,104. A fixed array of receivers is distributed over the area and a transmitter is attached to the object to be tracked. Time of arrival measurements of transmitted signals at the distributed receivers are used to locate the object.

SUMMARY OF THE INVENTION

It would be desirable to provide a system by which the location of persons or objects can be determined wirelessly but without having to invest in a dedicated fixed network of radio receivers.

It would be desirable to re-use existing wireless technology, which may be provided for a different purpose, to allow position determination.

According to a first aspect of the present invention there is provided a radio transceiver, a method and an arrangement. The arrangement may be time-variable in its distribution, number and/or identity of transceivers. Transceivers in an arrangement can form an adaptive and ad hoc network with proximal transceivers. The transceiver which forms the network can acquire its position from the other transceivers involved in the network and, after it has acquired its position, the transceiver can be included in a network by a proximal transceiver which is acquiring its position. This provides for the current proximal transceivers to be used for position determination instead of some fixed infrastructure.

According to a second aspect of the invention there is provided a radio transceiver. A transceiver can determine its position by taking into account not only the positions of the first order transceivers and a transceiver can communicate with but also the positions of the second order transceivers to which the transceiver is unable to communicate. This is particularly useful when the identities of and position information held by the first-order and second-order transceivers may change frequently.

According to a third aspect of the invention there is provided a radio transceiver. A transceiver determines its position by calculations involving the positions of first order transceivers, received from the transceivers, and a indication of the trustworthiness of the transmitting transceivers. For example, a reference transceiver will be trusted, whereas a very mobile transceiver will not. As opposed to the prior art where the positioning infrastructure is fixed and trustworthy, the transceivers which are used to acquire a position in embodiments of the invention change, perhaps frequently, and some will be more reliable than others. This aspect of the invention addresses that problem.

According to a fourth aspect of the invention there is provided a receiver and a method. This provides a neat and powerful methodology for calculating the probable position of a receiver.

BRIEF DESCRIPTION OF THE DRAWINGS

For a better understanding of the present invention and to understand how the same may be brought into effect reference will now be made by way of example only to the accompanying drawings in which:

FIG. 1 illustrates an office environment 2 in which an ad hoc network of low power transceivers is formable. There is shown in the figure a wall mounted reference transceiver 4 and a number of office appliances which are hosts to other transceivers. These appliances are a printer 6, a first computer 8, a desk telephone 10, a second computer 12 and a hand-portable communication device 14 such as a mobile phone. The reference transceiver 4 in this example is permanently positioned on the wall at a known location or alternatively the reference transceiver could be mobile and have integrated position locating technology such as GPS. The transceivers in the printer 6, computers 8 and 12 and the desk phone 10 move when the host is moved, which is likely to be infrequently. The low power transceiver in the portable device 14 is moved when the host is moved which is frequently. The reference transceiver 4 is optional and is not essential to the performance of the invention. Although an office environment 2 has been illustrated, this is only exemplary. In another network the portable device 14 may be a vehicle with another transceiver(s) embedded in other vehicle(s) and at the roadside.

Each of the low power transceivers can communicate with other transceivers that are within range and form an ad hoc network with those in-range transceivers. One of the transceivers acts as a Master of the network and the remaining transceivers are Slaves. The Master is at the centre of the network and normally communicates with a single Slave at any one time, although it is possible for it to broadcast to all the Slaves simultaneously. The network is a spoke network with the Master at the hub and a Slave at the end of each spoke which may be of different lengths.

The maximum extent of the network is determined by the distance at which the ability of the Master to communicate with a Slave transceiver is lost. The size of the network is determined by the number of Slave transceivers the Master can control. In the Bluetooth system (specification 1.0) this number is 7 Slave transceivers.

Figure 1:
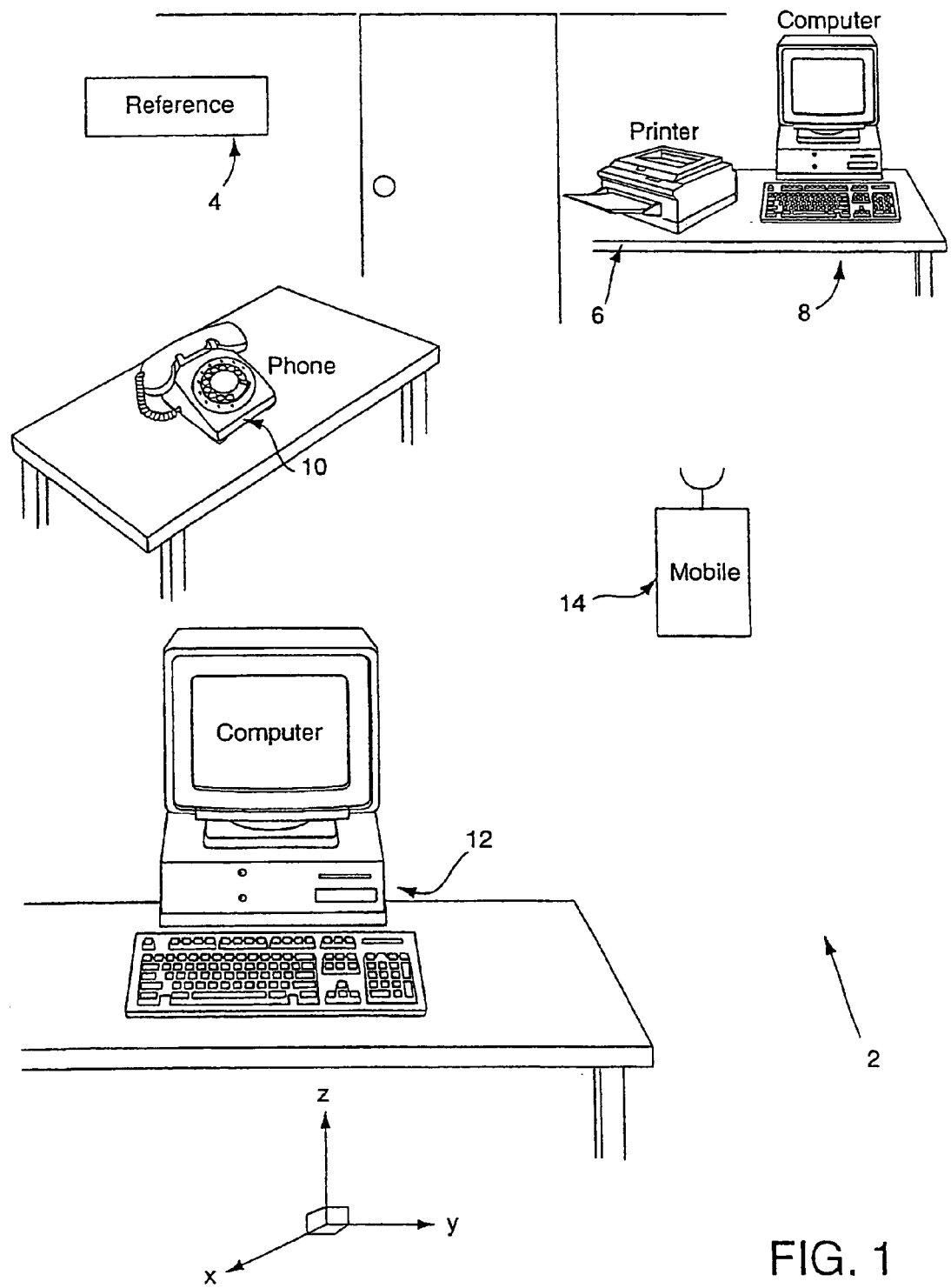
FIG. 1 illustrates an office environment in which an ad hoc network of low power transceivers is formable.

The ad hoc network formed by a Master may be used to determine the position of the Master transceiver. Referring to FIG. 1, if the position of the portable device 14 was required, the transceiver hosted by the device would operate as a Master and create an ad-hoc network with those transceivers within range. In this example it is the reference transceiver 4, and those within the printer 6, computers 8 and 12 and the desk phone 10. The Master interrogates each Slave and from the responses received determines its position.

The Slaves are able to store an indication of their position. Typically each transceiver stores a record of its position in three dimensions.

In a first embodiment the position of the slave is transferred to the Master and the Master estimates the distance between a Slave of known position and itself. Typically this is done by receiving a signal transmitted from the Slave to the Master at a known power and by measuring the power of the signal received at the Master. The attenuation of the signal is calculated and the transmission distance estimated. If the transmission from Slave to Master is direct then the transmission distance corresponds to the distance between Slave and Master. It may alternatively be possible to use time of arrival (TOA) calculations to determine the separation distance of Slave and Master. The Master then uses the knowledge of the actual positions of the local transceivers and the knowledge of their respective distances from the Master, to estimate the actual position of the Master. The estimation may conveniently use fuzzy logic.

In a second embodiment the position of each Slave is transferred to the Master. The Master uses the position of each of the Slaves and the fact each slave is within a communication range to estimate its position. The estimation may conveniently use fuzzy logic. This method is less accurate than the method of the first embodiment but is less resource intensive and does not require special circuitry to measure the power of received signals or their time of arrival.

The estimation may take into account for each of the Slaves the uncertainty in the position of a Slave. The value of this uncertainty is transferred from the Slave to the Master. The estimation may take into account for each of the Slaves the uncertainty in the distance calculated between Slave and Master. The value of this uncertainty is calculated in the Master. The estimation may take into account for each of the Slaves the likelihood that the Slave has been moved since it last recorded its position i.e. the likelihood that the record of position transferred from Slave to Master is incorrect. The transceivers may be rated according to their trustworthiness. Thus the reference transceiver 4 would be rated trustworthy, the transceivers in the printer, computers and desk phone would be rated neutral and the transceiver in the portable device would be rated as untrustworthy.

The Master may then transmit its newly calculated position to the Slaves in the network. This may activate some of the Slaves to reacquire their position by acting as Master. That is, the network as a whole is adaptive.

Figure 2:
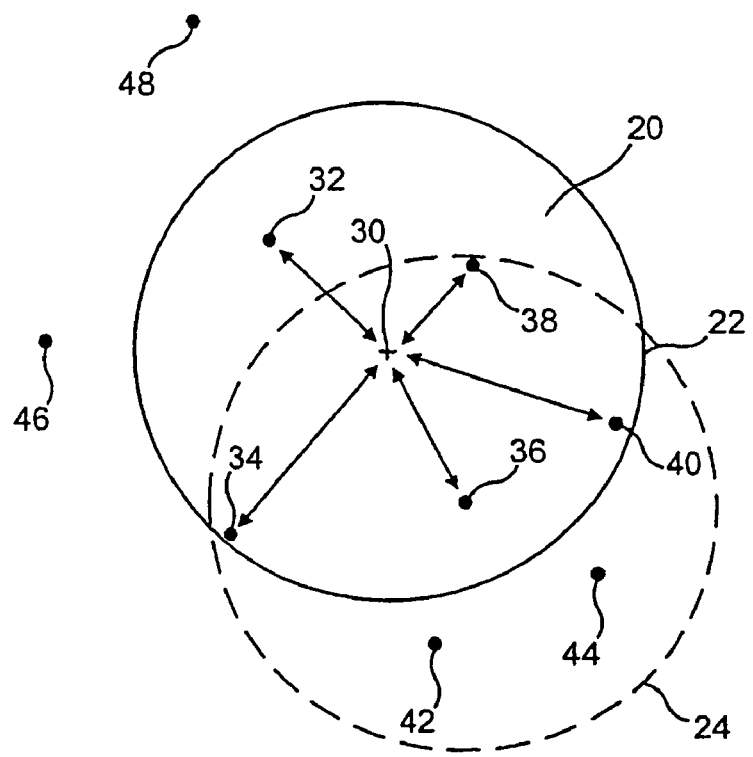
FIG. 2 illustrates a wireless network having a Master and a plurality of Slaves.

FIG. 2 is an illustration of a network 20. The network comprises Master transceiver 30 at the hub and Slave transceivers 32, 34, 36, 38 and 40 which lie within the perimeter 22 of the physical extent of the network. The transceivers 42, 44, 46 and 48 are not part of the network 20. The network 20 is determined by which of the transceivers 30, 32, 34, 36, 38, 40, 42, 44, 46 or 48 is acting as Master. It is preferable but not essential that each transceiver transmits with the same power and the physical extent of the network is determined by that power. It will be appreciated that if transceiver 36 were Master, the perimeter of the network would be designated by the dotted line 24 and that transceivers 38, 30, 34, 40, 42 and 44 would be Slaves to that ad hoc network.

Figure 3A:
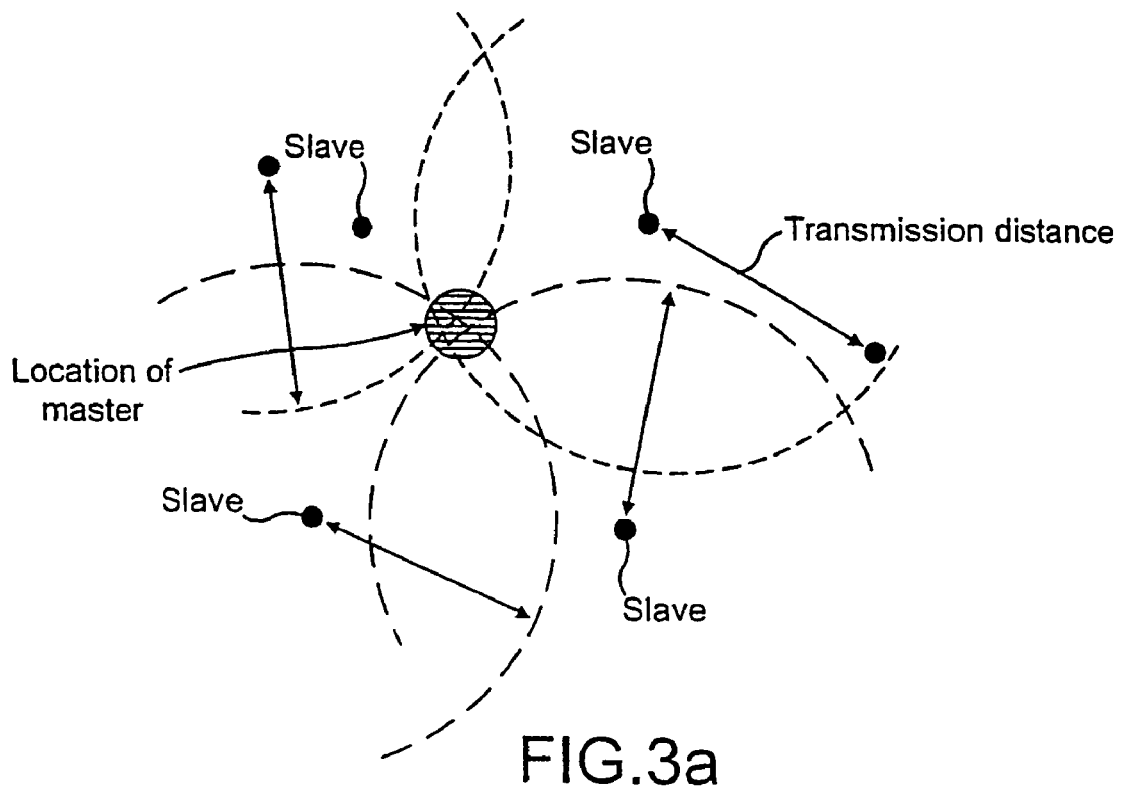
FIGS. 3a and 3b illustrate how the position of a Master is determined from information provided by the Slave according to separate embodiments.

FIG. 3a illustrates how according to the first embodiment, for network 20 of FIG. 1, the position of Master 30 may be estimated if the position of the transceivers 32, 34, 36, 38, 40 is known and the distance of those transceivers from the Master is known. For each Slave transceiver of known position, the Master should lie on the circle centred on the Slave transceiver's position which has a radius equal to the calculated distance between that Slave transceiver and the Master transceiver. The greater the number of Slave transceivers of known position used the greater the potential accuracy of locating the Master transceiver.

Figure 3B:
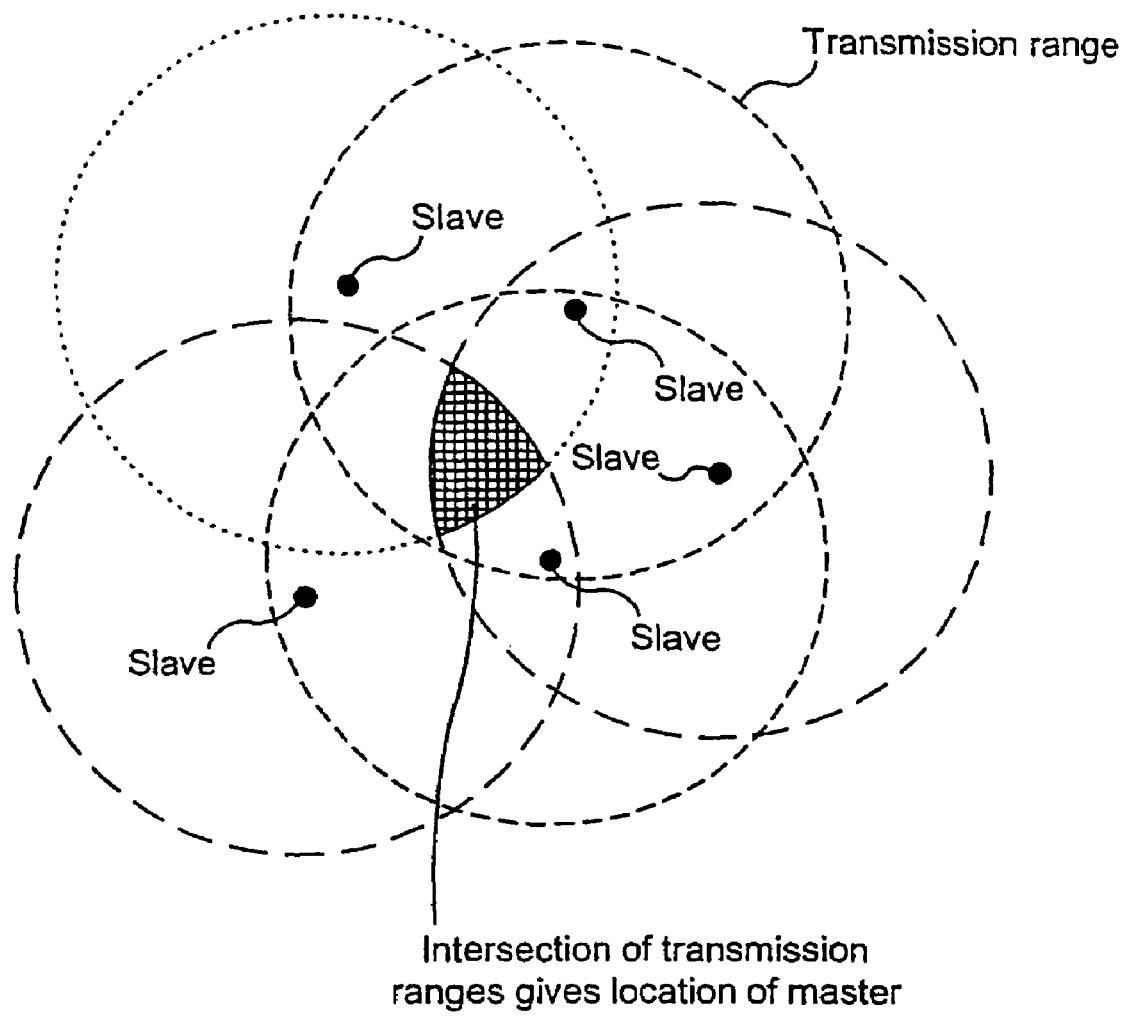

FIG. 3b illustrates how according to the second embodiment, for network 20 of FIG. 1, the position of Master 30 may be estimated if the position of the transceivers 32, 34, 36, 38, 40 is known and the maximum distance of those transceivers from the Master is known. In the illustrated example each of the transceivers transmits at the same power and so each has the same range. This simplifies the example but is not essential. What is important is for the Master to know the maximum range of each of the Slaves. For each Slave transceiver of known position, the Master should lie with the circle centred on the Slave transceiver's position which has a radius equal to that transceiver's transmission range. The greater the number of Slave transceivers of known position used the greater the potential accuracy of locating the Master transceiver.

Figure 4A:
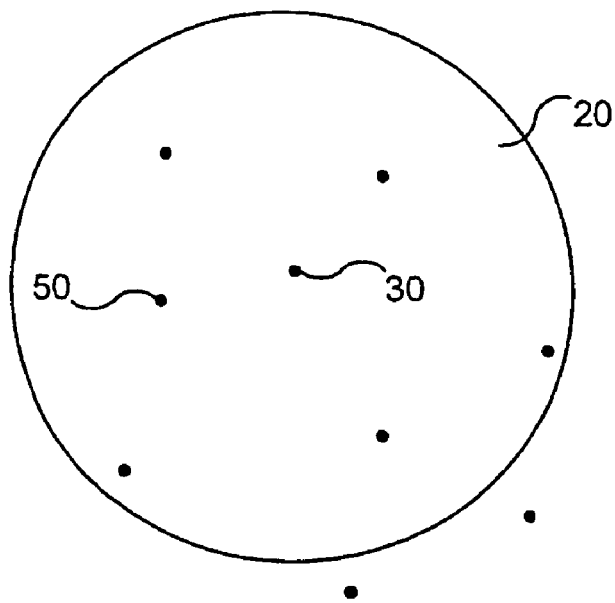
FIGS. 4a, 4b and 4c illustrates how the network may be dynamically changed.

FIG. 4a illustrates the network 20 at a later time, when the transceiver 30 has started position acquisition and is therefore acting as Master. However, a new transceiver 50 has come within the perimeter 22 and is a Slave transceiver in the network 20.

Figure 4B:
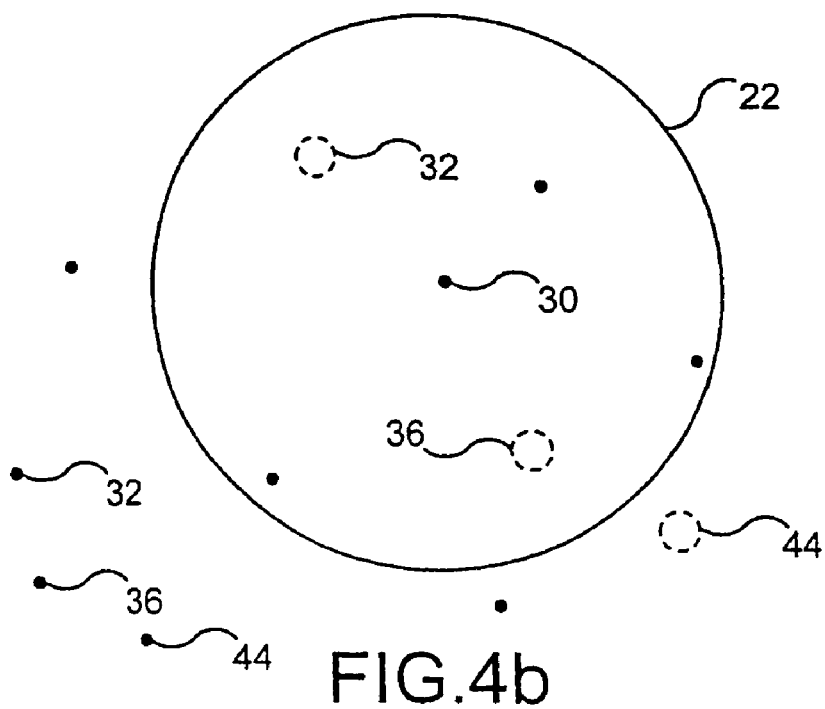

FIG. 4b illustrates the network 20 at a later time, when the transceiver 30 has started position acquisition and is therefore acting as Master. However, transceivers 32, 36 and 44 have been moved. The transceivers 32 and 36 are no longer within the perimeter 22 and do not form part of the network 20.

Figure 4C:
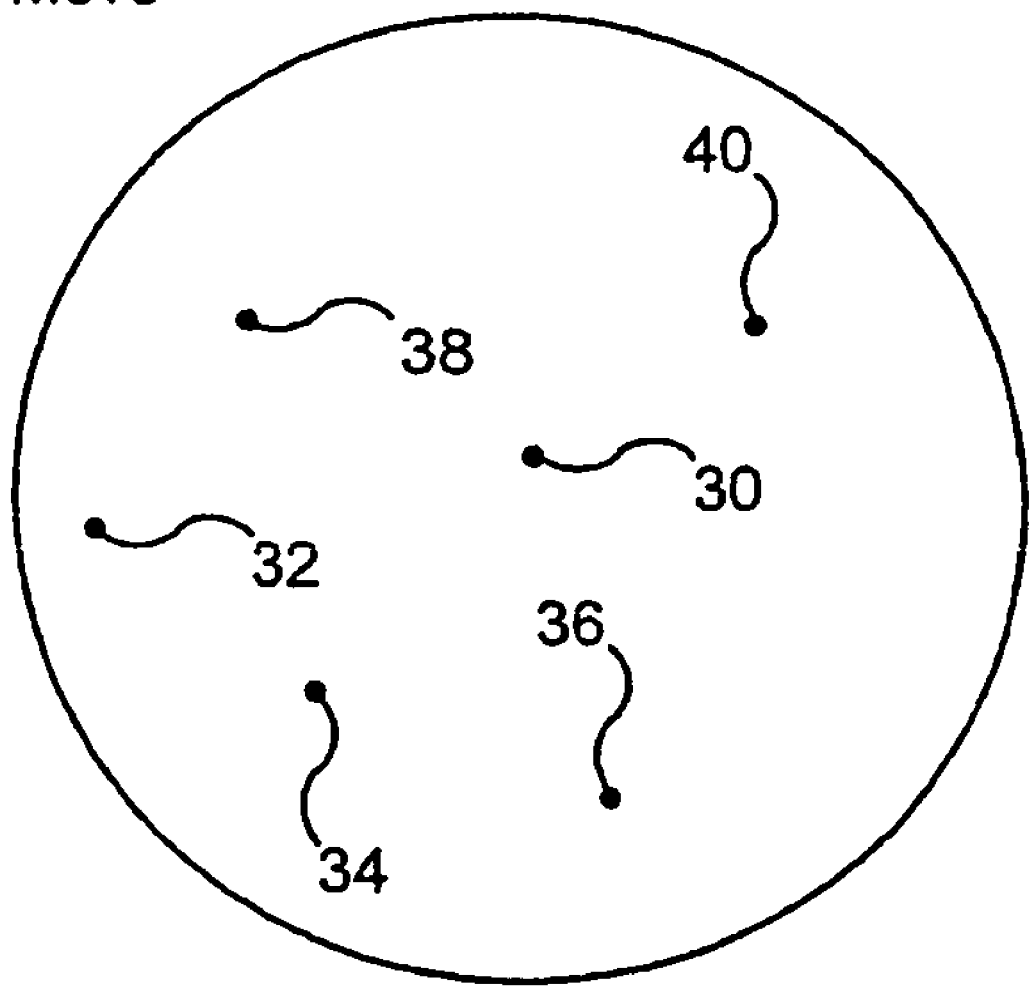

FIG. 4c illustrates the network 20 at a later time, when transceiver 30 has started position acquisition and is therefore acting as Master. The Slave transceivers 32, 34, 36, 38 and 40 present in network 20 illustrated in FIG. 4a are still present but they have been moved but remain within the perimeter 22.

Network 20 is dynamic in that the constituent transceivers are changeable. The network is ad hoc in that any transceiver may act as Master and create a network, the other transceivers within range functioning as Slaves.

Figure 5:
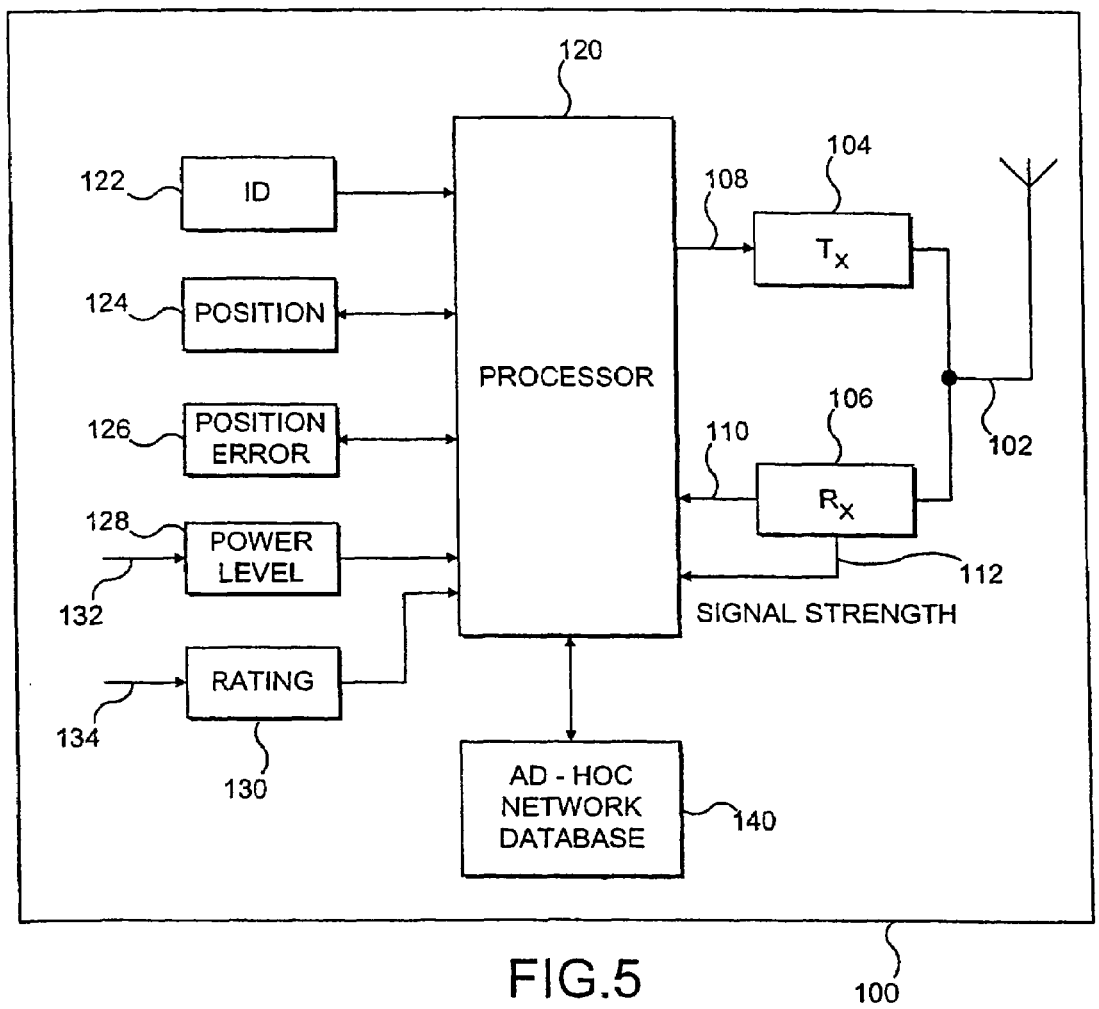
FIG. 5 is a schematic illustration of a transceiver.

FIG. 5 illustrates a low power radio frequency transceiver 100. The transceiver preferably operates in accordance with the Bluetooth protocol. An example of an exemplary LPRF transceiver is described in UK Patent Application No 9820859-8 the contents of which are hereby included by reference.

According to the Bluetooth protocol, a transceiver may variably act as a Master controlling a network or as a Slave within a network. The Master and Slave transceivers communicate using data packets. The transceivers within a network operate in a time division duplexed fashion and transmission and reception at one transceiver does not occur simultaneously.

According to embodiments of the invention, the transceiver 100 comprises an antenna 102, transmitter circuitry 104, reception circuitry 106, a processor 120, a memory 140 for an ad hoc network database, a memory 122 storing a code for uniquely identifying the transceiver to other transceivers, a memory 124 for storing the current position of the transceiver, a memory 126 for storing a position error which indicates the accuracy of the value stored in memory 124, a memory 128 for storing a value representing the power at which the transceiver transmits, and a memory 130 which stores a value indicating the trustworthiness of the content of memory 124.

The unique ID may be read by the processor 120 and is used by the transceiver when transmitting to correctly identify the source of transmissions.

The position value stored in memory 124 is typically a three dimensional co-ordinate (x, y, z), where x, y and z are suitable, possibly different, units of measurement indicating a position from a uniquely defined origin. The x, y and z axes are illustrated in FIG. 1. In one possibility the values x and y may be measured in metres and the value z may indicate the correct floor of the building. The position error may have three values X, Y and Z, indicating the potential error in x, y and z respectively or be a single value. The processor 120 is able to write to and read from memories 124 and 126.

Preferably all the transceivers operate at the same power level. The processor 120 reads values from memory 128 which represents the power of the transmitter circuitry 104. The value in memory 128, may if necessary be adjusted via a signal 132.

The value stored in memory 130 indicates the likelihood of the transceiver having been moved since its position was last determined and hence the likelihood that the values in memory 124 and 126 are incorrect. A fixed or permanent reference transceiver has a value [11] (trustworthy), a transceiver in a movable or semi-permanent host has a value [10] (neutral) and a transceiver in a portable host has a value [01] (untrustworthy). A motion detector within the host may also or alternatively be used to reset, using signal 134, the value in memory 130 to [00] (incorrect). The processor 120 is able to read memory 130. The memory 140, stores a database containing entries for each Slave transceiver of the ad hoc network for which the transceiver was last Master or is currently Master. The database has a row for each of the Slave transceivers. In the first and second embodiments each row preferably has 5 fields: Slave ID, Slave Position, Slave position error, Slave rating, and a final field. In the first embodiment this field is a measure of the distance between Master and Slave. It may be the received power level of Slave or the conversion of this value into a distance or a distance probability e.g. d<2 m; 2 m<d<4 m). In the second embodiment the last field is a measure of the maximum transmission range of each Slave and may consequently not be used if all transceivers transmit with a predetermined power and therefore have a predetermined range.

For a particular row, the values in the fields record the situation when the network was last active. The slave ID is the unique ID stored in memory 122 of a particular Slave and was transferred to the Master via the network. The Slave Position and Slave Position Error are the values which were stored in the memory 124 and 126 respectively of that particular Slave when the network was last active and were transferred to the Master over the network. The Slave rating is the value which was stored in the memory 130 of that particular Slave when the network was last active and was transferred to the Master over the network.

As an example the content of the database 140 for the transceiver 30 illustrated in FIG. 2 may for a transceiver according to the first embodiment be something like:

| Slave ID | Slave Position | | Slave Position Error | | Slave Rating | Distance (m) |
| --- | --- | --- | --- | --- | --- | --- |
| | x | y | X | Y | | |
| 32 | 42 | 43 | 1 | 1 | [11] trustworthy | 4 |
| 34 | | | | | [10] neutral | |
| 36 | 68 | 8 | 1 | 2 | [10] neutral | 5 |
| 38 | | | | | | |
| 40 | 88 | 19 | | | [10] neutral | 6 |

The third dimension z, Z has not been used. In this example, transceiver 38 is a Bluetooth transceiver and can therefore form part of the network 20, but it does not have the necessary functionality to perform or assist in position acquisition. It has therefore been identified in field 1, but the remaining fields are empty. Transceiver 34 is a Bluetooth transceiver with the correct functionality to perform and assist in position acquisition, but it has not yet acquired its own position. It has therefore been identified in fields 1 and 4, but the fields relating to location are empty.

The database 140 is completely rebuilt each time the transceiver 100 forms a network.

Although described as different memories, the memories 122, 124, 136, 128, 130 and 140 may be implemented as different parts in one or more memories.

The processor 120 provides data 108 to transmitter circuitry 104 for transmission via antenna 102. Antenna 102 is also connected to receiver circuitry 106 which supplies received data 110 to the processor 120.

The receiver circuitry 106 may optionally have additional circuitry (not shown) for measuring the power of a signal received by antenna 102 and it supplies an indication of the received signal strength to the processor via signal 112.

FIRST EMBODIMENT

The process of Position Acquisition in accordance with the first embodiment will now be explained in more detail with reference to FIGS. 6a, 6b and 6c which describe events occurring in the network Master and FIGS. 7a, 7b and 7c which describe events occurring in each of the network Slaves.

A transceiver forms an ad hoc network by functioning as a Master. While functioning as a Master the transceiver can determine its position by entering the Position Acquisition Mode 200. The Master transceiver polls local transceivers 202 to form an ad-hoc network. The Master transceiver determines 204 the number M of Slave transceivers in the network. The Master transceiver then creates the database 140 for the network by performing a series 206 of steps for each Slave transceiver. The Master transceiver sends 208 a Request signal addressed to a first Slave transceiver. The Master then awaits 210 a response from the first Slave transceiver. The absence of a response indicates that the first Slave transceiver does not have the appropriate functionality to assist in position acquisition. A response form a first Slave transceiver which has previously acquired its own position includes the fields for the database: Slave ID, Slave Position, Slave Position Error and Slave Rating. This information is transferred from the first Slave transceiver to the Master in the payload of a packet and written 216 along with the calculated value for the distance between Master and Slave, to the first row of the database 140.

A response from a first Slave transceiver which has not previously acquired its own position includes the fields for the database: Slave ID, Slave Rating. This information is transferred from the first Slave transceiver to the Master in the payload of a packet and written to the first row of the database 140.

If the Slave transceiver has previously acquired its own position, then the steps 212 and 214 are carried out before the database is written to, to determine the fifth field of the database, Distance. At step 212 the power of the incoming signal strength from the first Slave transceiver is sampled and this is used in step 214 to estimate the distance between the Master and first Slave. The power at which the first Slave is transmitting is either a standard value or the value is transferred from Slave to Master. A comparison of the received power of a signal transmitted from the first Slave and the power of the transmitted signal allows the amount of attenuation to be calculated and the distance between Slave and Master to be estimated.

A row of the database is completed for each of the Slaves by cycling through loop 206. When, the database is complete the loop 206 is exited at A.

Figure 6A:
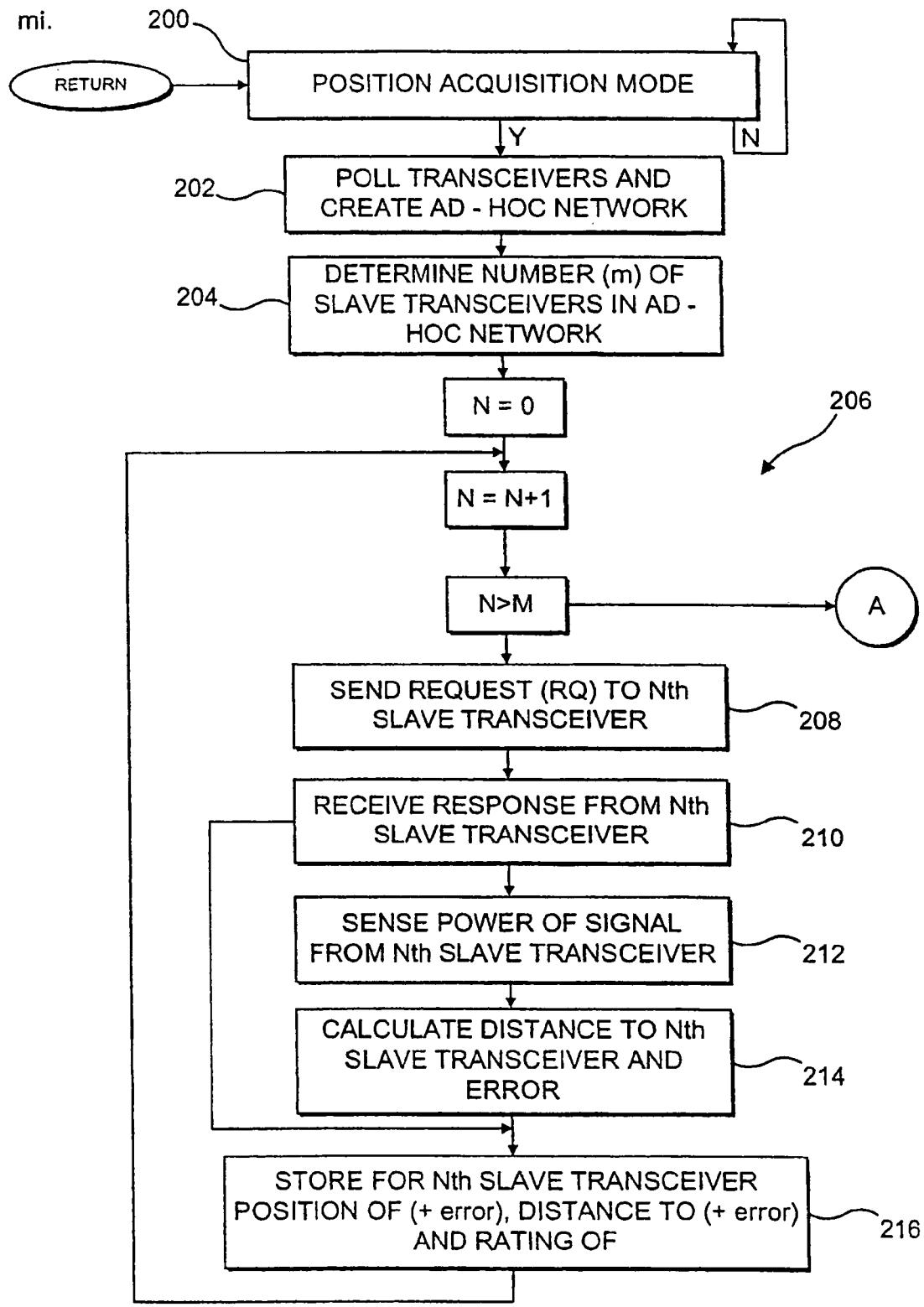
FIGS. 6a, 6b and 6c illustrate the operation of a Master in Position Acquisition Mode.
Figure 6B:
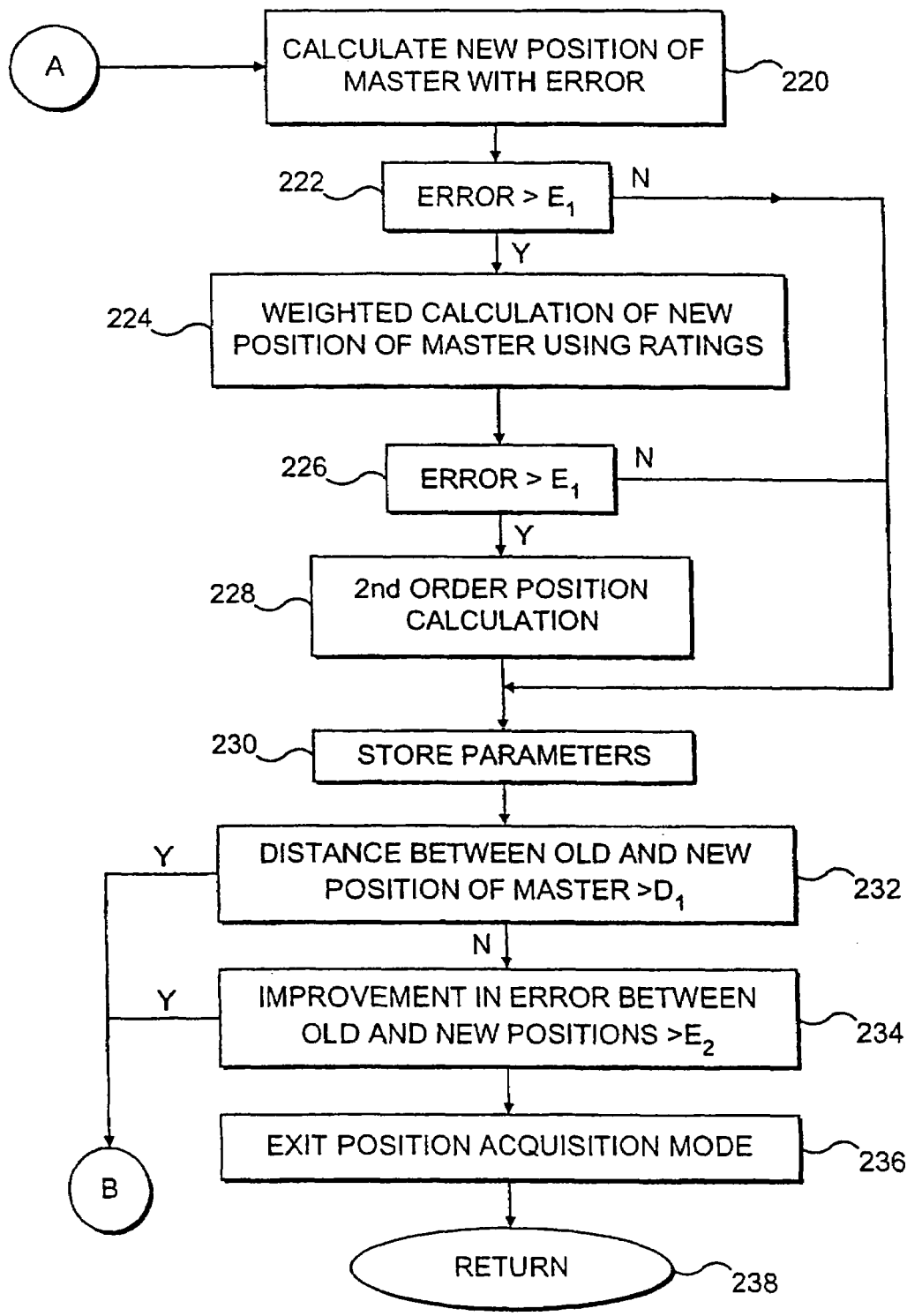

Referring to FIG. 6b, the Master then calculates 220 the position of the Master from the information recorded in fields 2, 3 and 5 of the database 140 (Slave Position, Slave Position Error and Distance) and estimates the error in the calculated Master position.

If the error is sufficiently small 222, then the position values are stored to memory 124 and the error values are stored to memory 126 with the old values (if any) temporarily stored in the processor 120.

If the error is greater than a predetermined value E1, then a weighted calculation of the Master position is made on the basis of the information stored in fields 2, 3, 4 and 5 of the database 140 (Slave Position, Slave Position Error, Slave Rating and Distance). In this weighted calculation, the values for trustworthy Slaves (rating=[11]) are double entered and the values for untrustworthy Slaves (rating=[01]) or incorrect Slaves (rating=[00]) are ignored. The weighted calculation produces a new position for the Master and a new error value.

If the error is sufficiently small 226, then the position values are stored to memory 124 and the error values are stored to memory 126 with the old values (if any) temporarily stored in the processor 120.

If the error is greater than a predetermined value E2, then a second-order position calculation is performed. The first-order network is that network formed by the current Master which is acquiring its position and the other transceivers in the network are first order Slaves. A second order network is one formed when a first order Slave acts as a second-order Master and creates a network with second-order Slaves. The previously described position calculations were first-order in that they only used position information about first-order Slave transceivers to the first-order Master's network. A second order calculation in addition to using position information about first-order Slave transceivers to the Master's network, uses information about second-order Slave transceivers. Information about the second-order Slaves is stored in each of the databases 140 of the first-order Slaves. This information describes the last ad-hoc network a now first-order Slave formed when it was previously a second-order Master. The first-order Master transceiver requests the transfer of each of its Slaves' databases 140.

From the second-order databases, the Master determines the areas the Master cannot be located in because the Master does not have identified second-order Slaves as first-order Slaves. The Master then uses the information in its database concerning the position of the first order Slaves to determine the area in which the Master may be located. The Master uses the information about second-order Slaves transferred from the databases of the first-order Slaves to identify second-order Slaves which are outside communication range with the Master and are not therefore first order Slaves. The Master excludes portions of that newly determined area in which the Master cannot be located as it is out of range of the identified second order Slaves. The result is converted into position values with associated error values. The position values are stored to memory 124 and the error values are stored to memory 126 with the old values (if any) temporarily stored in the processor 120.

The difference between the old and new values of position are compared 232 and if they exceed a threshold value an Updating routine 240 is started at B, in which the new values are communicated to the Master's Slaves allowing them to update their databases 140, and if necessary re-acquire their position in the light of that new information. If the difference in position does not exceed a threshold, then the difference in error is calculated. If this exceeds a threshold the Updating routine 240 is entered at B. If the difference does not exceed a threshold E2, then the Position Acquisition Mode is exited 236 and the program returns 238.

Figure 6C:
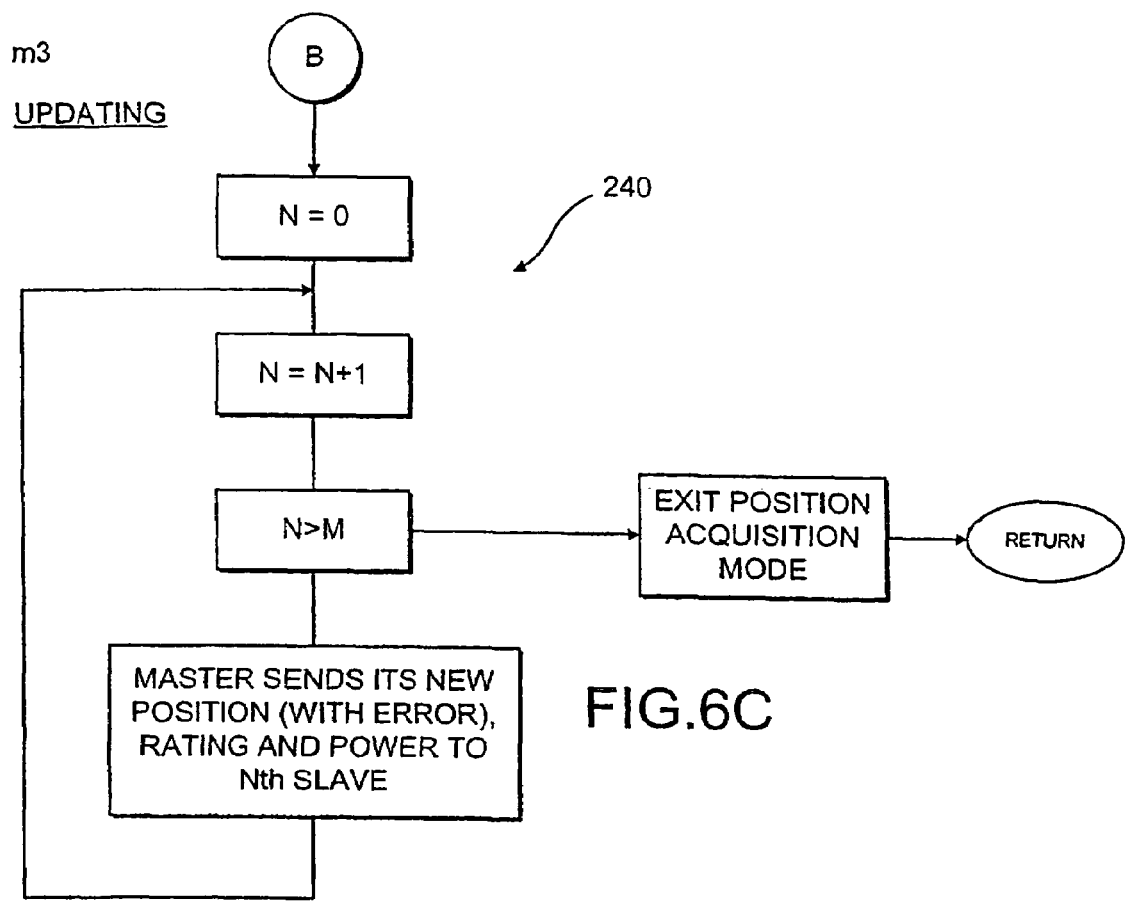

The updating routine 240 is illustrated in FIG. 6c. The Master sends an Update packet to each one of the Slave's in its network. The packet has a payload containing ID (read from the Master's memory 122), Position (read from the Master's memory 124), Position Error (read from the Master's memory 126), Transmit Power (read from the Master's memory 128) and Rating (read from the Master's memory 130).

Figure 7A:
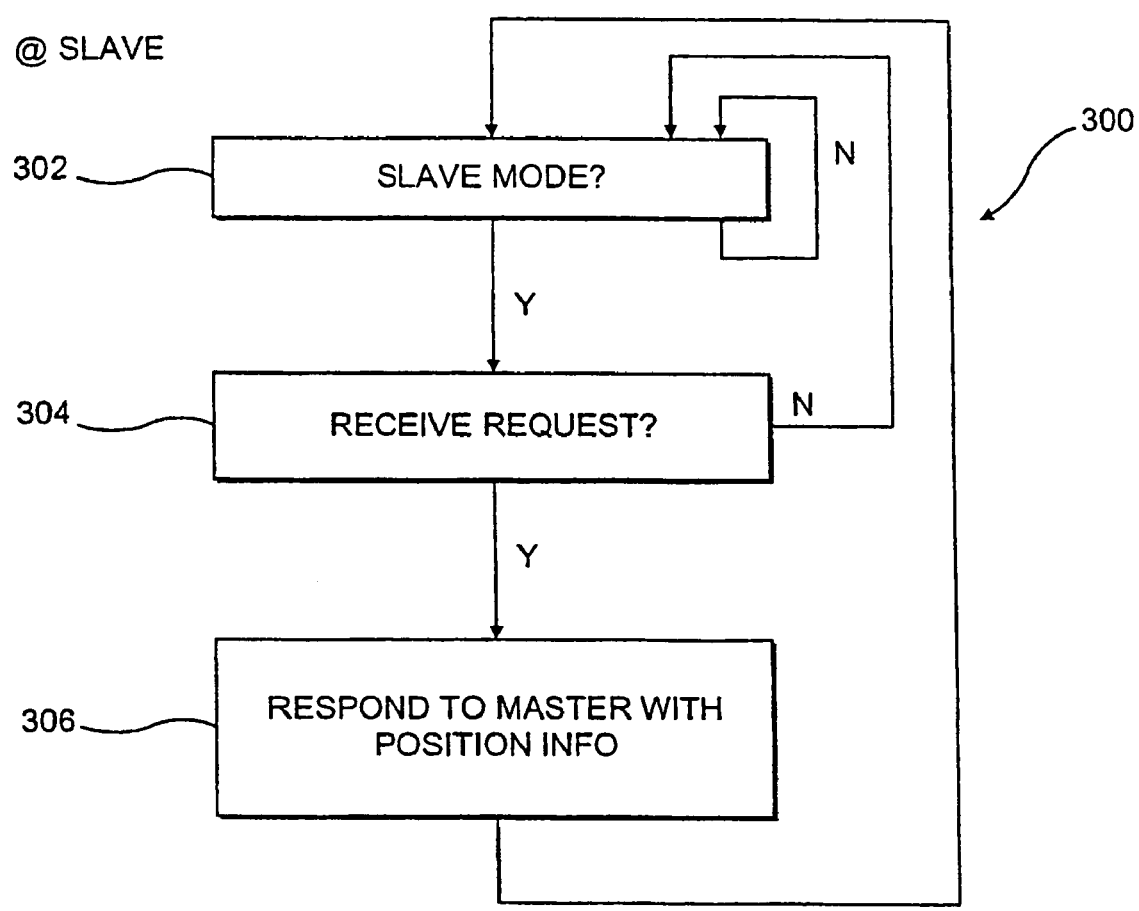
FIGS. 7a, 7b and 7c illustrate the operation of a Slave during position acquisition by the Master.

FIG. 7a illustrates the process of Request—Response which occurs in a Slave. If the transceiver is in Slave Mode 302 and it receives a position acquisition request 304 from a Master transceiver, the Slave responds 306 by reading from its memories 122, 124, 126, 128 and 130 and sending a packet to the Master. The packet has a payload containing Slave ID (read from the Slave's memory 122), Slave Position (read from the Slave's memory 124), Slave Position Error (read from the Slave's memory 126), Transmit Power (read from the Slave's memory 128) and Slave Rating (read from the Slave's memory 130).

Figure 7B:
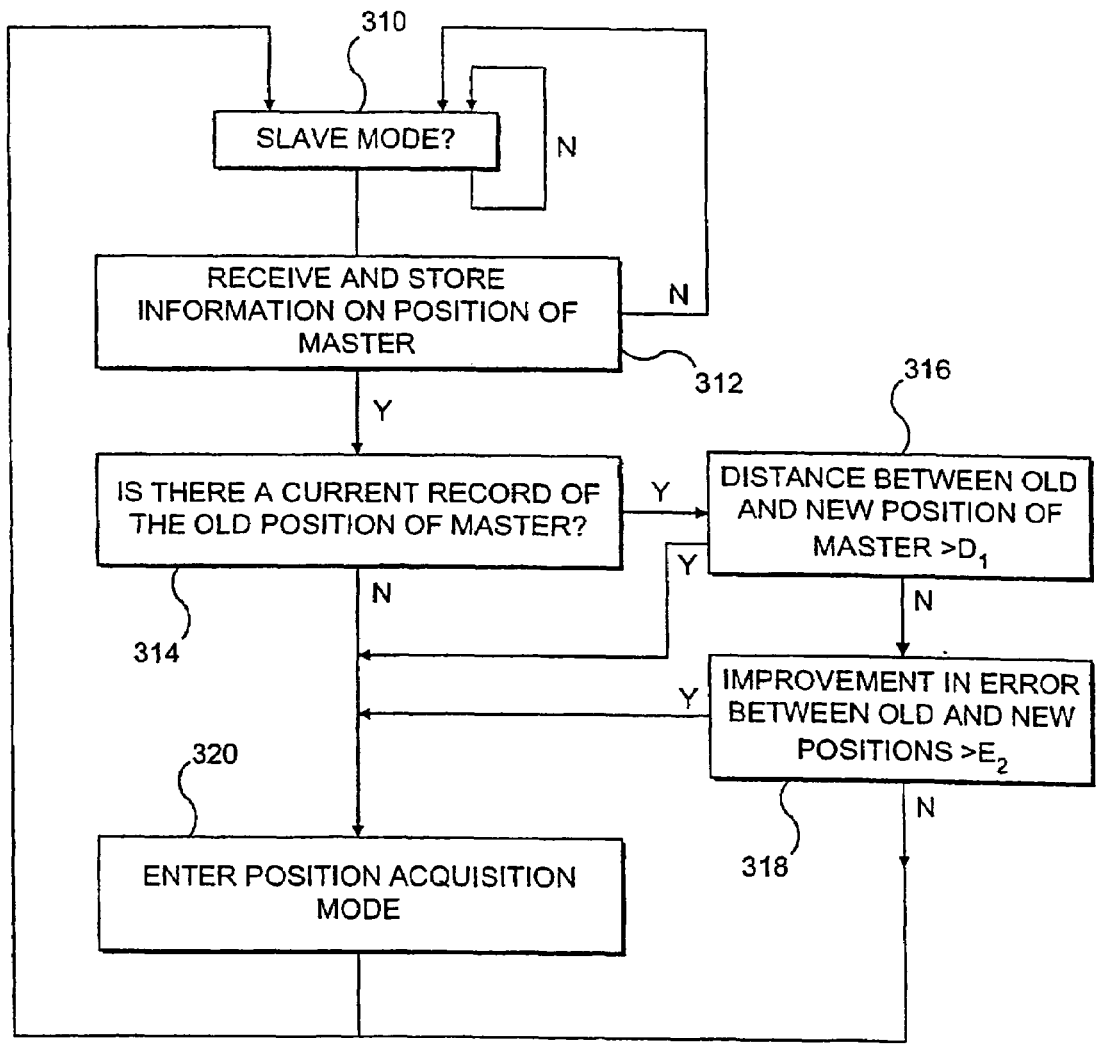

FIG. 7*b* illustrates how a Slave may respond to receiving an Update packet from the Master (see FIG. 6*c*). When the transceiver is in the Slave Mode 310 and it receives an Update packet from the Master 312, it temporarily stores the information content in its processor 120. The processor 120 then examines the database 140 of the Slave, to determine if there is already a record there for a transceiver with the same ID. If there is no such record, the Slave enters the position acquisition mode 320 which has been described in relation to FIGS. 6*a*, 6*b* and 6*c*. If a record already exists, then the distance between the old position for the transceiver and the new position are compared. If they differ by more than a threshold value then the position acquisition mode is entered 320. If they differ by less than the threshold, then the difference in the error values for the new record compared to the old record are compared. If the difference exceeds a threshold value then the position acquisition mode is entered, if not the Slave returns to its idle state.

Figure 7C:
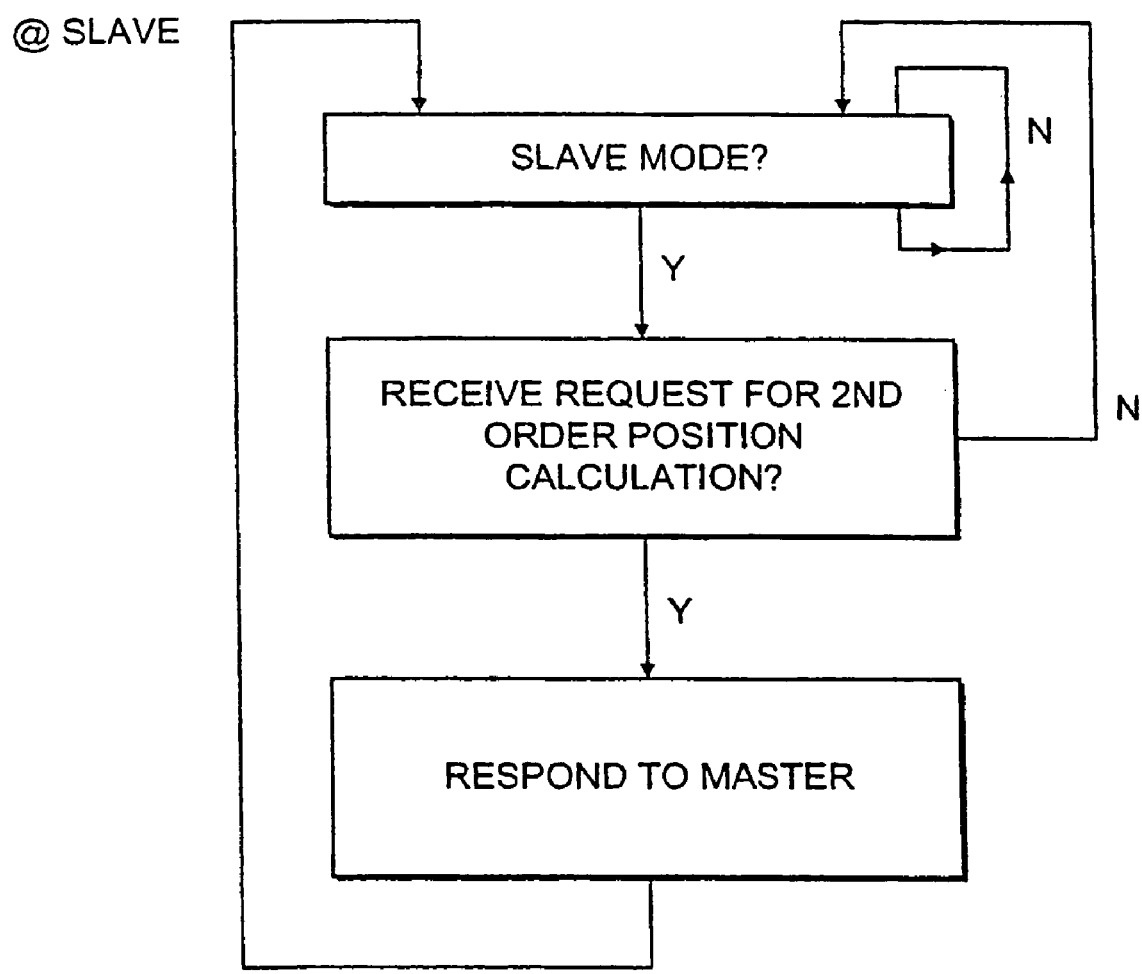
Figure 8:
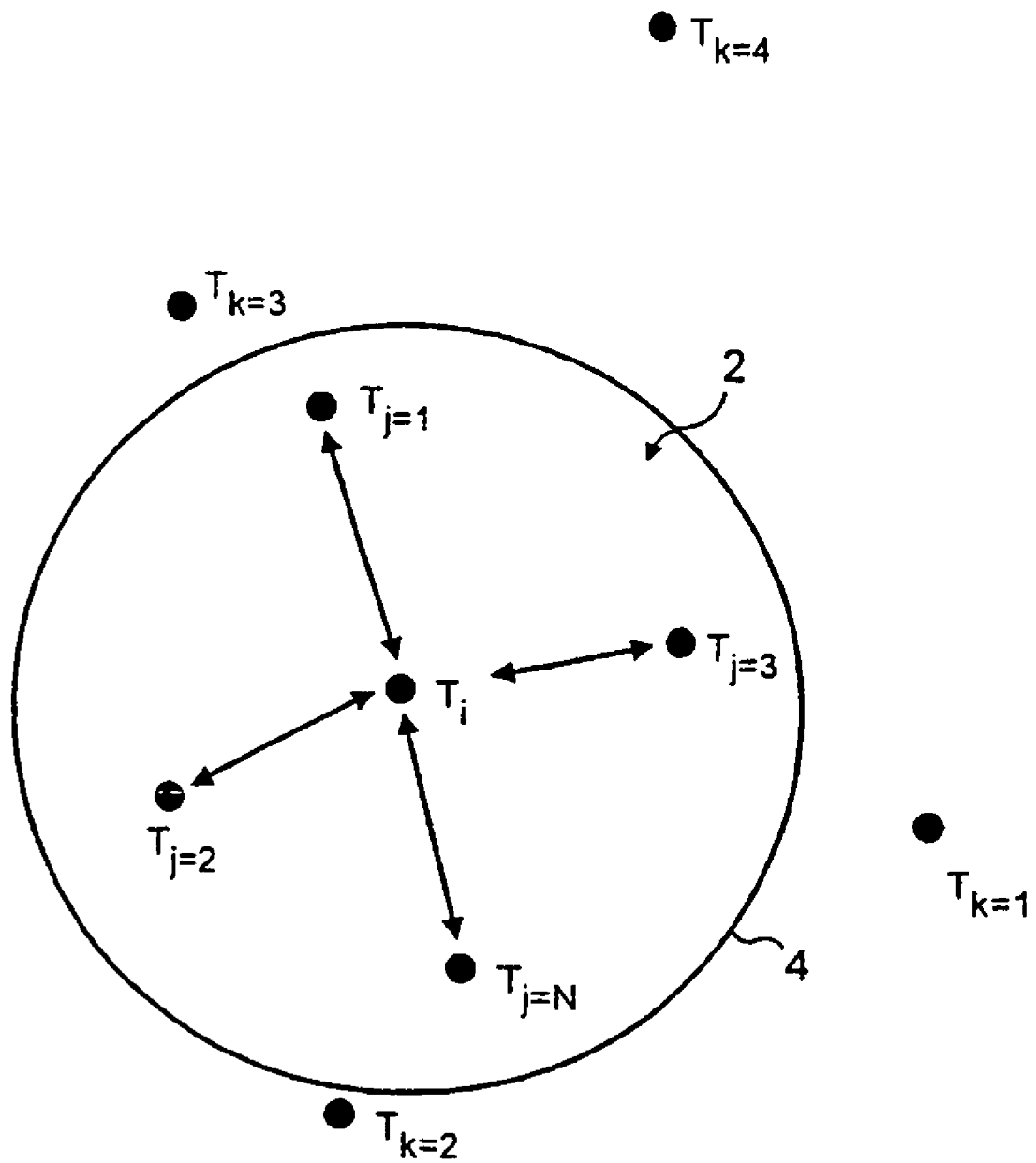
FIG. 8 illustrates a distribution of transceivers T.

FIG. 7*c* illustrates how a Slave transceiver responds to a request for second order position acquisition. The Slave sends the contents of its database 140 to the Master.

SECOND EMBODIMENT

The procedure of position acquisition by the Master previously described in relation to FIGS. 6*a*, 6*b* and 6*c* according to the first embodiment, is similar for the second embodiment. The differences are:

after step 210 and before step 216 there is a single step in which the Master determines the maximum communication range for the Nth Slave which is subsequently stored in the 5$^{th}$ field of the database in step 216;

the step of calculating the new position of the master with error 220 is as previously described in relation to FIG. 3*b* using the information recorded in fields 2, 3 and 5 of the database 140 (Slave Position, Slave Position Error and Maximum range).

The process of Request-Response which occurs in a Slave according to the second embodiment is the same as described in relation to FIGS. 7*a*, 7*b* and 7*c*. If the Slaves transmit at a constant power (and therefore have constant range), then the Slave will transmit a packet to the Master. The packet has a payload containing Slave ID (read from the Slave's memory 122), Slave Position (read from the Slave's memory 124), Slave Position Error (read from the Slave's memory 126), and Slave Rating (read from the Slave's memory 130).

If the Slaves transmit at different power levels, then each payload will additionally need to contain Transmit Power (read from the Slave's memory 128). This indication of its transmitting power level is also an indication of its transmitting range.

From the foregoing description it will be appreciated that a transceiver which needs to acquire its position can do so by communicating with nearby transceivers. A transceiver may enter the position acquiring mode in response to an interrupt. This interrupt may be manually generated by a user through a user interface or from a clock within the transceiver. For example, such interrupts may be generated regularly by a clock every 30 minutes. The duration between interrupts may be programmable. An interrupt may optionally be produced when a transceiver is polled by a newly local transceiver or when the transceiver polls a newly local transceiver. A transceiver also enters the position acquisition mode in step 320 of FIG. 7*b*.

The network may be set up and/or calibrated using a portable transceiver which also contains other positioning technology. This positioning technology may be a GPS circuit which gives the location of the device in global coordinates. Less advantageously the positioning technology may be mobile radio telephone circuitry for use in a cellular network of fixed radio base stations and adapted to use an estimation of its distance from the local fixed base stations to estimate its position. Such a device may be rated as a reference device and will set up local transceivers by providing them with information about its position. The reference device enters the position acquisition mode as illustrated in FIG. 6*a*. At step 220 it uses its positioning technology to calculate the new position and then jumps to step 230. Likewise, when the reference device responds to the master at step 306 it uses its positioning technology to calculate its position and uses this position in its response to the Master. The reference device need not remain within a particular network zone but can migrate through many network zones calibrating each. It is not essential for an ad hoc network to have a reference transceiver.

AN ALTERNATIVE SECOND EMBODIMENT

In the alternative second embodiment the position of each Slave is transferred to the Master as a probability function. The Master estimates or derives a probability function representing the likelihood of successful transmission from the Slaves to the Master. The Master uses the probable position of each of the Slaves and the probability function representing the likelihood of successful transmission to estimate its position.

The described database needs some modification to accommodate this alternative embodiment. The Slave Position and Slave Position error may be the mean and standard deviation if the probable position can be represented as a normal distribution, otherwise they should be replaced by the probability function representing the Slave's position. The Final field will be used to record the probability function representing the likelihood of successful transmission, if it varies from Slave to Slave.

Figure 9:
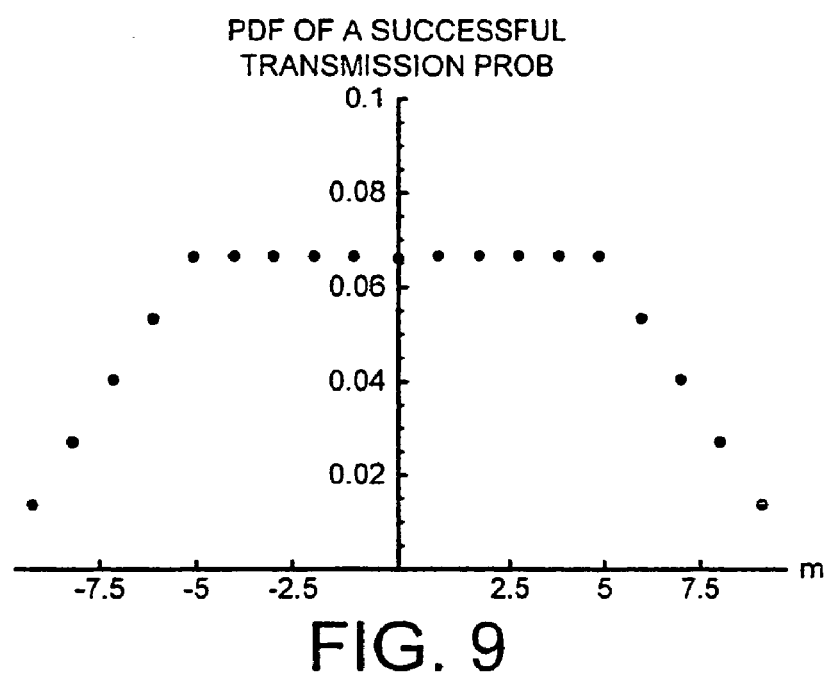
FIG. 9 illustrates an exemplary probability density function representing the chances of successful transmission between transmitter and receiver as the distance between transmitter and receiver varies.

FIG. 9 illustrates a transceiver Ti which is capable of forming an ad hoc network 2 via radio communications with the transceivers Tj. The network may be formed by Ti acting as a Master with the transceivers Tj functioning as Slaves. Preferably the transceivers are Bluetooth transceivers and the network is a piconet. When the transceiver Ti acquires its position it forms a network with neighbouring transceivers Tj which have already acquired their positions. The communication range of transceiver Ti is illustrated by the circle 4. There are a number of transceivers Tj which are outside the range 4 and cannot participate in the network 2.

The transceiver Ti, once it has acquired its position it can participate as a Slave in a different network formed by another transceiver to acquire its position. Each of the transceivers T are the same. Each transceiver acts as a Master to form a network with Slave transceivers to acquire a position and then participate as a Slave in a different network formed by another transceiver to acquire its position. The transceivers T are not infrastructure. They are preferably integrated into host devices such as mobile phones, desk telephones, computers etc. The transceivers which are available to participate in a network may therefore vary as transceivers move into and out of range of the Master transceiver.

Referring to FIG. 9, the transceiver Ti is attempting to determine its position. It forms a network with N transceivers Tj where j=1, 2, 3 . . . N.

The probability that a transceiver Tj can transmit successfully to the transceiver Ti when separated by distance y is given by $prob_{TransSuccessful.ji}[y]$. The probability density function representing the probability a transceiver j can transmit successfully to the Transceiver Ti is given by $pdf_{TranSuccessful.ji}[y]$.

where $$pdf_{TransSuccessful.ji}[y] = \frac{prob_{TransSuccessful.ji}[y]}{\int_{-\infty}^{\infty} prob_{TransSuccessful.ji}[y] dy}$$

If all transmitters Tj are equal, $prob_{TransSuccessful.ji}[y]$, may be replaced by $prob_{TransSuccessful}[y]$ which represents the probability that any one of the transceivers Tj can transmit successfully to the transceiver Ti when separated by distance y. The probability density function representing the probability a transceiver j can transmit successfully to any one of the Transceiver Ti is given $pdf_{TransSuccessful.ji}[y]$ where $$pdf_{TransSuccessful}[y] = \frac{prob_{TransSuccessful}[y]}{\int_{-\infty}^{\infty} prob_{TransSuccessful}[y] dy}$$

Figure 10:
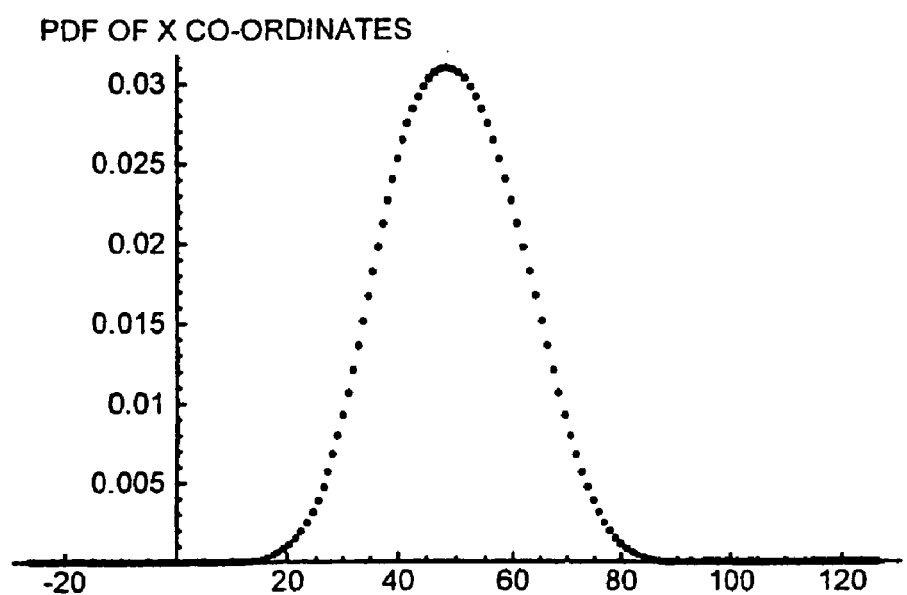
FIG. 10 illustrates an exemplary probability density function representing the probable location of a transceiver on the x-axis.

FIG. 10 illustrates an exemplary probability density function representing the chances of successful transmission between a transmitter and receiver Ti as the distance between transmitter and receiver varies. The probability density function may be based on measurements for example by sounding the communication channel between transmitter and receiver. The probability density function may be an approximation, chosen to ease subsequent calculations. The illustrated probability density function is an approximation which eases subsequent calculations. It assumes that within a certain range of the transmitter the chances of reception are good and constant, but at a certain threshold distance from the transmitter the chances of reception decrease proportionally with the distance travelled from the threshold.

The transceivers T are preferably positioned in three dimensions with respect to three orthogonal linear axes. Although this is not essential, it provides advantages because the positioning of a transceiver with respect to one of the axes is independent of the positioning with respect to the other two axes. The transceiver is therefore positioned in three dimensions by positioning it separately with respect to each axis. In the following description the positioning of a transceiver Ti with respect to one axis is described. Analogous procedures are carried out for the remaining axes.

Each transceiver is positioned with respect to the linear axis using a probability density function. The transceiver Tj is positioned with respect to the linear axis by $pdf_j[z]$ where the argument indicates a position of the transceiver Tj from an origin common to the transceivers Tj. The function $pdf_j[z]$ varies as the argument varies having a maximal value at where the most likely acquired position for transceiver Tj is. The transceiver Ti will acquire its position by calculating a probability density function $pdf_i[z]$ for itself.

Figure 11:
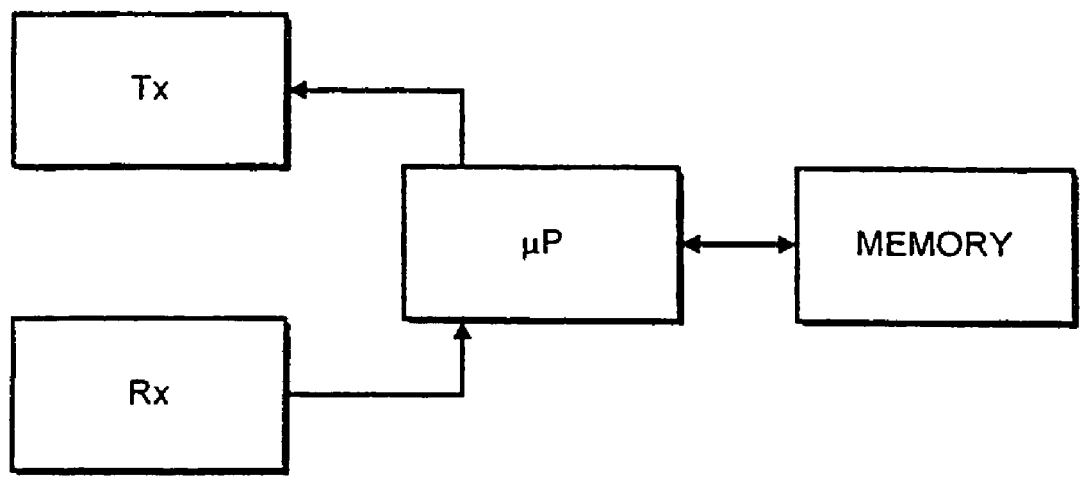
FIG. 11 illustrates a transceiver.

FIG. 11 illustrates an exemplary probability density function $pdf_i[z]$ representing the probable location of a transceiver on the x-axis, where z represents a distance along the x-axis.

When the transceiver Ti is acquiring its position, it receives $pdf_j[z]$ from each of the N transceiver Tj where j=1, 2, 3 . . . N. That is it receives $pdf_1[z]$ from T1, $pdf_2[z]$ from T2, $pdf_3[z]$ from T3, etc.

If all transmitters Tj are equal, there is no necessity for each of the transmitters j to send $prob_{TransSuccessful.ji}[y]$. The values of $prob_{TransSuccessful}[y]$ may be stored in Ti. However, if the transmitters Tj have different transmission characteristics such as different transmission power levels then it may be appropriate for each of the transceivers Tj to transmit $prob_{TransSuccessful.ji}[y]$ to the transceiver Ti.

On the basis of this information the transceiver Ti can calculate its position according to a first order calculation. This first order calculation takes into account, the transceivers Tj with which the transceiver Ti can directly communicate. The calculation determines where the transceiver Ti could be because it can communicate with the transceivers Tj.

The transceiver Ti can calculate its position density function $pdf_i[z]$, which takes into account all the transceivers Tj, by combining the intermediate probability density functions $pdf_{ij}[y]$ calculated because the particular Transceiver Tj can communicate with Ti, for all j.

The intermediate probability density functions $pdf_{ij}[y]$ calculated because the particular Transceiver Tj can communicate with Ti is given by:

$$pdf_{ij}[y] = \frac{\left(\int_{-\infty}^{\infty} pdf_j[z] prob_{TransSuccessful.ji}[y-z] dz\right)}{\int_{-\infty}^{\infty}\left(\int_{-\infty}^{\infty} pdf_j[z] prob_{TransSuccessful.ji}[y-z] dz\right) dy}$$

This can be converted using mathematics to:

$$pdf_{ij}[y] = \int_{-\infty}^{\infty} pdf_j[z] pdf_{TransSuccessful.ji}[y-z] dz$$

The probability density function representing the position of the receiver Ti is therefore given by the convolution of the probability density function representing the position of the transmitter Tj with the probability density function representing the likelihood of successful transmission from the transmitter to receiver.

The transceiver Ti can calculate its position density function $pdf_i[z]$, which takes into account all the transceivers Tj, by combining the intermediate probability density functions $pdf_{ij}[y]$ calculated because the particular Transceiver Tj can communicate with Ti as follows:

$$pdf_i[y] = \frac{\prod_{j=1}^{N} \alpha_j df_{ij}[y]}{\sum_{y'}\left(\prod_{j=1}^{N} \alpha_j pdf_{ij}[y']\right)}$$

where

-continued $$\sum_{j=1}^{N} \alpha_j = 1$$

where $\alpha_j$ is a parameter which represents how trustworthy the Transceiver Tj is. For example, if the transceiver Tj is a reference station it will have a high value, whereas if the transceiver Tj is very mobile it will have a low value. It should be appreciated that the values $\alpha_j$ may be transmitted by transceiver Tj to transceiver Ti (although renormalization will be required such that $\Sigma \alpha_j = 1$), or the values of $\alpha j$ may be calculated by Ti on the basis of information received from the transceivers Tj such as other indications of their trustworthiness.

The use of trustworthiness in the calculation can be disabled by setting $\alpha_j = 1$ for all j.

The above calculation of $pdf_i[z]$ effectively determines the renormalized overlap of the probability density functions $pdf_{ij}[z]$ (taking into account their trustworthiness if appropriate) for all j. A problem, however, arises if the probability density functions $pdf_{ij}[z]$ do not overlap.

A preferred method of combining the intermediate probability density functions $pdf_{ij}[y]$ takes into account that the intermediate probability density functions $pdf_{ij}[y]$ may not all overlap. The method combines the intermediate probability density functions in a pair-wise fashion. If the pair of probability density functions which are to be combined do overlap the method calculates the renormalized overlap of the two intermediate probability density functions. However, if the pair of probability density functions which are to be combined do not overlap, the method calculates a weighted sum of the two probability density functions.

One manner of implementing the preferred method will now be described. In this preferred method the transceiver Ti, before it has acquired its new position, may have no current position or may have a position which has expired. If the current position has expired the variable $pdf_{i(old)}[y]$ is set equal to the current expired value of $pdf_i[y]$. If there is no current position the variable $pdf_{i(old)}[y]$ is set equal to 0. A temporary variable $pdf_{i\,Temp,j}[y]$ is assigned for use in the calculation. It is initially set for j=0, equal to $pdf_{i(old)}[y]$. The temporary variable $pdf_{i\,Temp,j-1}[y]$, is combined in a pair-wise fashion with $pdf_{i,j}[y]$, starting with the pair-wise combination of variable $pdf_{i\,Temp,0}[y]$ with $pdf_{i,1}[y]$ to produce $pdf_{i\,Temp,1}[y]$, then the pair-wise combination of $pdf_{i\,Temp,1}[y]$ with $pdf_{i,2}[y]$ to produce $pdf_{i\,Temp,2}[y]$, etc., ending with the pair-wise combination of $pdf_{i\,Temp,N-1}[y]$ with $pdf_{i,N}[y]$ to produce $pdf_{i\,Temp,2}[y]$ which is the position of Ti ($pdf_i[y]$) taking into account only the first order transceivers Tj, for j=1, 2, 3 ... N.

The method can be coded as follows:

Start Code:
Initial condition: $pdf_{i\,Temp,0}[y] = pdf_{i\,(old)}[y]$
Body of the loop started with j = 1 and exited at j = N
{
(Test for overlap between $pdf_{i\,Temp,j-1\,[y]}$ & $pdf_{ij}[y]$)

If $\sum_{y'} pdfiTempj - 1[y'] pdfij[y'] \neq 0$ then (If there is overlap, calculate the renormalized overlap)

-continued $$pdfiTempj = \frac{pdfiTempj-1[y']\alpha j pdfij[y]}{\sum_{y'}(pdfiTempj-1[y']pdfij[y'])}$$

else
    (If there is no overlap, calculate a weighted sum)
    $pdf_{i\,Tempj}[y] = pdf_{i\,Tempj} - 1[y] + \alpha j pdf_{ij}[y]$
}End of loop
Final Result:

Thus far the value of $pdf_i[y]$ representing the position of the transceiver Ti, takes into account only the transceivers Tj{j=1, 2, ... N}, which can communicate directly with the transceiver Ti. Each of the transceivers Tj may be able to directly communicate directly with transceivers with which the transceiver Ti is unable to directly communicate. Such transceivers are second order transceivers as the transceiver Ti which is acquiring its position cannot communicate to them directly but can receive information about them from the transceivers it can communicate with. Information about the second order transceivers can be used to additionally refine $pdf_i[y]$ so that it takes account not only of where the transceiver Ti could be because it can directly communicate with transceivers Tj but also where it could not be because it cannot communicate with the second order transceivers.

Let each of the second order transceivers be designated by Tk, where $k \neq j$ and $k \neq i$, k=1, 2 ... M.

In the above coding, the loop is directly followed and the "Final result" is directly preceded by the coding:

Body of the loop started with k = 1 and exited at k = M
{

$$probnoreception.ki[y] = \sum_{z} pdfk[z](1 - probTransSuccessfulki[y - z])$$

$$pdfiTempk = \frac{pdfiTempN[y].probnoreception.ki[y]}{\sum_{y'}(pdfiTempN[y].probnoreception.ki[y])}$$

$pdf_{iTemp.N}[y] = pdf_{iTemp.k}[y]$
}end of loop

It is necessary for the transceiver to receive the values of $pdf_k[y]$ via the first order transceivers which are in communication with the second order transceivers.

Likewise $prob_{TransSuccessful.ki}[y]$ should also be transmitted to Ti via the first order transceivers Tj. However, if all the second order transceivers are the same then $prob_{TransSuccessful.ki}[y]$ will be a constant and can be stored. According to one embodiment, the approximate value $prob_{TransSuccessful}[y]$ which was used in the first order calculations is also used in the second order calculations.

The probability density function representing a position of a transceiver will normally have a normal distribution as illustrated in FIG. 3. Advantages can be achieved by assuming such pdfs have a normal distribution. The completed information required to define a normal distribution is the mean and the standard deviation. Consequently the probability density function representing the position of a transceiver can be transmitted using only two parameters—the mean and standard deviation.

A transceiver suitable for carrying out the invention comprises transmitter circuitry, receiver circuitry, a processor and a memory. The memory stores the above described algorithm. The processor executes the algorithm. The parameters used as input to the algorithm are stored in the memory and the result of the algorithm, the position of the transceiver, is also stored in the memory. When the transceiver operates as a receiver, to acquire its position, it receives the parameters it requires for the algorithm from the transceivers it is in communication with and stores them in the memory. When the transceiver operates as a transmitter, it is operable to transmit its stored position to the receiving transceiver using its transmission circuitry. The algorithm may be transported for transfer to a transceiver using a carrier such as a CD-ROM or floppy disc.

The transceivers hereinbefore described may be conveniently integrated into mobile phones and the mobile phone may be used to communicate the phone's acquired position over the radio interface for use within the network such as the provision of value added services or elsewhere.

The transceiver when acting as a Master may request some user input to assist it in the acquiring of a position such as the selection between two or more ambiguous positions.

Although the present invention has been described in the preceding paragraphs with reference to various examples, it should be appreciated that modifications and variations to the examples given can be made without departing from the scope of the invention as claimed.

The invention claimed is:

1. A receiver for calculating a position of the receiver according to a plurality of transmitters, including a processor being
    arranged to calculate a probability density function for each of said plurality of transmitters by the convolution of
        (i). the probability density function representing a position of one of the plurality of said transmitters, sent by said one transmitter to the receiver; with
        (ii). the probability density function representing a likelihood that a transmission from said one transmitter will be successfully received at the receiver; and
    arranged to combine the resultant plurality of probability density functions.

2. A receiver as claimed in claim 1 wherein the combination of the resultant probability density functions involves a pair-wise combination of probability density functions.

3. A receiver as claimed in claim 2 wherein the pair-wise combination involves a multiplication of one probability density function with another.

4. A receiver as claimed in claim 1 wherein the pair-wise combination involves an addition of one probability density function with another.

5. A receiver as claimed in claim 4, wherein the combination is a weighted combination.

6. A receiver as claimed in claim 5 wherein the weighted combination increases a contribution made from probability density functions derived from trusted transmitters.

7. A receiver as claimed in any preceding claim wherein the transmitters are not permanent infrastructure.

8. A receiver as claimed in claim 3, wherein the combination is a weighted combination.

9. A receiver as claimed in claim 8, wherein the weighted combination increases the combination made from the probability density functions derived from trusted transmitters.

10. A receiver as claimed in claim 1, wherein the probability density function representing the likelihood that a transmission from the first transmitter will be successfully received at the receiver is an approximation which simplifies processing.

11. A receiver as claimed in claim 1 wherein the possibility density function representing the likelihood that a transmission from a transmitter will be successfully received at the receiver is the same for each of the plurality of transmitters.

12. A receiver as claimed in 1, wherein the transmitters are not permanent infrastructure.

13. A receiver for calculating a position of the receiver according to a first transmitter, including a processor arranged to convolve:
    (i). a probability density function representing a position of the first transmitter, sent by the first transmitter to the receiver; with
    (ii). the probability density function representing a likelihood that a transmission from the first transmitter will be successfully received at the receiver.

14. A receiver as claimed in claim 13 for calculating its position according to a second transmitter, including a processor arranged to convolve:
    (i). a probability density function representing the position of the second transmitter, sent by the second transmitter to the receiver; with
    (ii). the probability density function representing a likelihood that a transmission from the second transmitter will be successfully received at the receiver.

15. A receiver as claimed in claim 14, wherein the probability density function representing the likelihood that a transmission from the first transmitter will be successfully received at the receiver is the same as the probability density function representing the likelihood that a transmission from the second transmitter will be successfully received at the receiver.

16. A receiver as claimed in claim 13 wherein the probability density function representing the likelihood that a transmission from the first transmitter will be successfully received at the receiver is an approximation which simplifies processing.

17. A method of calculating a position of a receiver by communication with a plurality of transceivers comprising the steps of:
    for each of said plurality of transmitters, convolving:
        (i). a probability density function representing a position of a transmitter, sent by the transmitter to the receiver, with
        (ii). a probability density function representing a likelihood that a transmission from the transmitter will be successfully received at the receiver; and
    combining the plurality of convolution products.

18. A method as claimed in claim 17 wherein the receiver is the master transceiver in an ad-hoc network of Bluetooth transceivers and the plurality of transmitters are slave transceivers in that Bluetooth network.

19. A method as claimed in claim 17 wherein the combination of the plurality of convolution products involves a pair-wise combination of convolution products.

20. A method as claimed in claim 19 wherein the combination is a weighted combination.

21. A method as claimed in claim 20 wherein the weighted combination increases the contribution made from convolution products derived from trusted transmitters.

* * * * *